June 8, 1965 P. W. MAURER ETAL Re. 25,793
MANUAL-AUTOMATIC CRUISE CONTROL CIRCUIT
Original Filed March 16, 1962
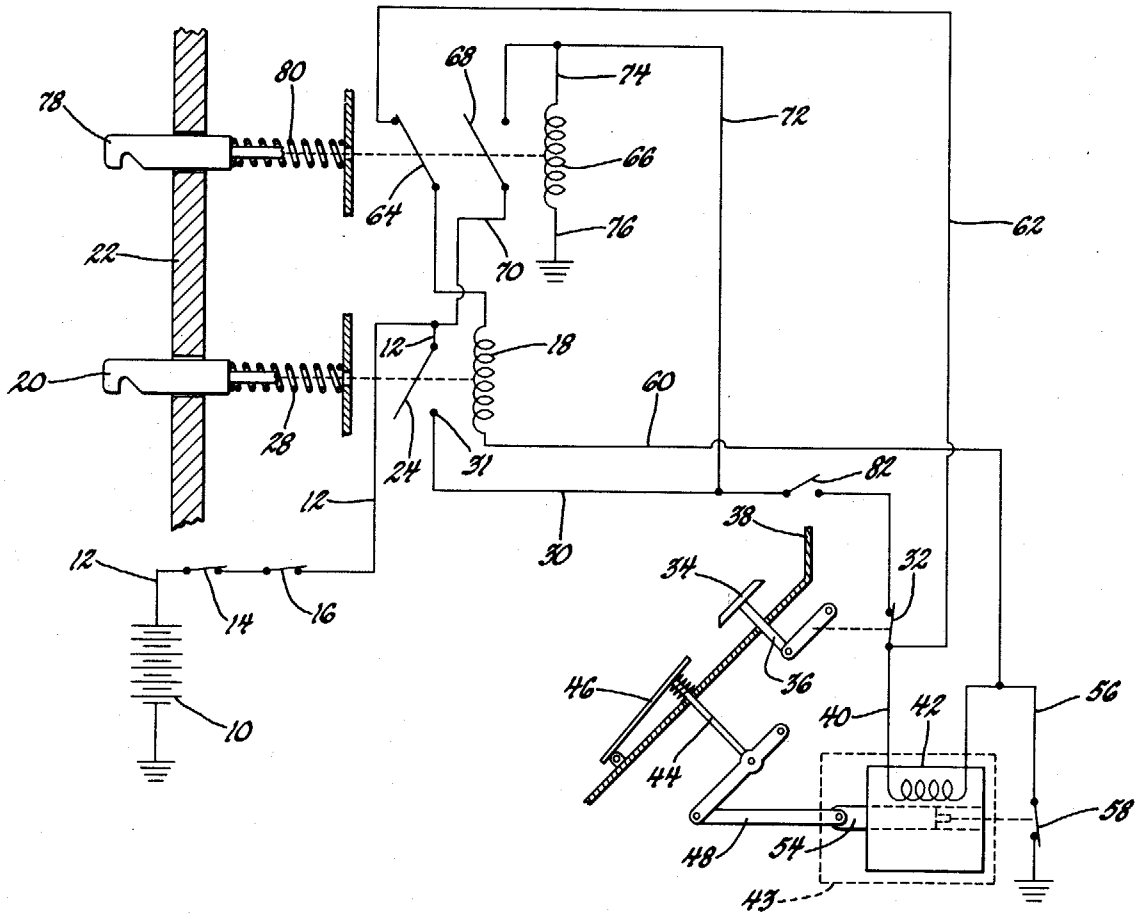
INVENTORS
Philip W. Maurer
James Wishart, Jr.
BY D. D. McGraw
THEIR ATTORNEY United States Patent Office Re. 25,793
Reissued June 8, 1965

25,793

MANUAL-AUTOMATIC CRUISE CONTROL CIRCUIT

Philip W. Maurer, Dearborn, and James Wishart, Jr., St. Clair Shores, Mich., assignors to General Motors Corporation, Detroit, Mich., a corporation of Delaware Original No. 3,100,021, dated Aug. 6, 1963, Ser. No. 180,128, Mar. 16, 1962. Application for reissue May 7, 1964, Ser. No. 375,689
10 Claims. (Cl. 180—82.1)

Matter enclosed in heavy brackets [ ] appears in the original patent but forms no part of this reissue specification; matter printed in italics indicates the additions made by reissue.

This invention relates generally to vehicle speed control systems and more particularly to an electric circuit for permitting such speed control systems to automatically become operative when the desired cruise speed is attained by the vehicle, or in the alternative, to be under manual control so that a positive action of the vehicle operator is required to engage the systems.

One of the functions of speed control systems is to control the road speed of a vehicle at a preselected value on highways without the necessity of the driver holding the accelerator pedal depressed. For safety reasons such systems are provided with a switch on the brake pedal in series with a part of the system's control circuit so that the circuit is deenergized whenever the brake pedal is depressed. To reset the system, it has been necessary to again accelerate the vehicle until it reaches the preselected speed and then to push a control button which may be mounted on the instrument panel to again lock in the control circuit. It has been deemed desirable to have the control circuit automatically re-engage as soon as the preselected speed is reached without the necessity of operating a separate button or control member each time the vehicle has been decelerated. However, such an arrangement requries safety controls to prevent an inexperienced person oprating the vehicle for the first time from suddenly going into cruising speed control and thereby losing manual control of the device.

It is, therefore, an object of this invention to provide automatic lock-in for speed control systems without the above-mentioned danger.

It is a further object to provide a circuit wherein the speed control may be locked in the cruise mode of operation by the push button means in the normal manner as described above.

In addition, a manual-automatic control is provided for vehicle speed systems. When the manual-automatic control is placed in the automatic position the system automatically locks in at a preselected speed. Upon release of the vehicle brake, should the brake be applied, the speed control system will again lock in automatically when the preselected speed is reached.

To protect the inexperienced driver, the manual automatic control will move from automatic to manual whenever the transmission is shifted into park, neutral or reverse positions, or whenever the ignition switch is turned off. If desired, this effect may also be obtained when any vehicle door is opened. It is then necessary to move the manual-automatic control back into automatic position before automatic lock-in is obtained. A circuit embodying the present invention is herein disclosed in which the manual-automatic control does not stay in automatic position unless the transmission selector is in a forward drive position and the ignition is on.

Reference to the accompanying drawing, which schematically illustrates the invention, and the following detailed description will enable one skilled in the art to practice the invention.

As illustrated, a battery 10 is electrically connected from one terminal to ground. The other terminal is electrically connected with a series of switches by the conductor 12. An automobile ignition switch 14 is adapted to be closed when the car ignition is in the on position and a transmission switch 16 is provided with any conventional actuating means (not shown) to maintain the switch in closed position in all forward drive positions.

Other switches as may be desired may be provided, in series with switches 14 and 16, which, e.g., open when any vehicle door is opened, or when a clutch pedal is depressed for operation of a manual transmission, or when the driver's seat is unoccupied.

A manually operable relay 18 is controlled by a spring biased button 20 mounted on a vehicle instrument panel 22 conveniently adjacent the vehicle operator. A conductive armature or switch 24 is mechanically connected to the button 20, as indicated by the dashed line, and is operatively associated with the relay 18. A spring 28 is mounted to bias the button outwardly from the instrument panel and to bias the armature or switch 24 to an open position as shown.

A conductor 30 is connected to an electrical contact 31 adapted to be engaged by the armature 24 and leads to a brake operated switch 32. As illustrated schematically the brake pedal 34 is mounted on brake actuating linkage 36 extending through the vehicle floor board 38 and mechanically connected, in any suitable manner, to the switch 32, so that the switch will be opened by any brake applying movement of the linkage.

A conductor 40 electrically connects the brake switch 32 and a solenoid 42 operatively associated in any conventional manner with the throttle actuating linkage so that energization of the solenoid will advance the position of a portion of the throttle linkage to the substantially full throttle position to render the speed control system operative in the cruising speed controlling condition. An example of a road speed control mechanism in which the solenoid 42 is employed and to which the present invention can be adapted is shown in United States Patent No. 2,972,390, entitled "Vehicle Road Speed Control," issued February 21, 1961, and assigned to the assignee of the present invention. In that patent disclosure, the accelerator pedal portion of the throttle linkage is locked in the substantially full throttle position by a solenoid equivalent to solenoid 42 and the speed error sensitive power servo modulates the throttle valve to maintain constant vehicle speed. This is permitted through a lost motion linkage between the locked linkage and the throttle valve linkage.

As shown, conventional throttle linkage 44 is associated with an accelerator pedal 46. The throttle rod 48 connected to linkage 44 may be adapted to open a normally closed throttle switch 58 when the accelerator pedal 46 is substantially fully depressed, as more fully disclosed in the above-noted patent. A conductor 56 connects the solenoid 42 to ground through the normally closed throttle switch 58.

Conductors 60 and 62 electrically connect the coil of relay 18 to the conductors 56 and 40, respectively. A switch 64 bridges the conductor 62 and is operatively associated with the conductive armature or switch 68 of a relay 66 and in its normal position completes a circuit from conductors 60 and 62 through the coil of relay 18. In its closed position, the armature or switch 68 of the relay 66 is connected by conductors 70, 72 to the conductors 12 and 30, respectively, on opposite sides of the relay 18. The coil of the relay 66 is electrically connected to conductor 72 through conductor 74 at one end and to ground 76 at the other end. A second control button lever 78 is connected to the armature or switch 68 and mounted adjacent the button 20 on the instrument panel 22. The control button 78 is biased outwardly from the instrument panel by a spring 80 to a position in which switch 64 is closed and the switch 68 is open. A speed selector switch 82 bridges the conductor 30 and is adapted to be held in the closed position by a suitable speed setting control so that the solenoid 42 will only be energized at the selected speed setting. Switch 82 may be held closed by mechanical means until the relay is deenergized.

In operation, the operator may energize the speed control solenoid 42 by pressing in either one of buttons 20 or 78. This may be accomplished by pressing button 78 at any time when switches 14 and 16 are closed and the vehicle has reached the desired speed. The energization of the solenoid 42 through conductor 12, switch 24, 31, conductor 30, switch 82, switch 32, conductor 40, conductor 56 and switch 58 permits the speed control system to maintain the vehicle speed at its chosen value. Continued energization of the solenoid 42, and hence the maintaining of a desired vehicle speed, is controlled by the position of the various circuit switches. The switch 14 is closed when the ignition of the vehicle is turned on and switch 16 is open in the neutral, park and reverse transmission positons. Assuming the transmission to be in one of the forward positions at which switch 16 is closed, the closing of armature or switch 24 by actuation of the first button 20 energizes a brake controlled circuit. Current will flow from the battery 10 through ignition switch 14, transmission switch 16, armature 24, brake switch 32, the solenoid 42 and the throttle switch 58 to ground. The relay 18 is simultaneously energized through conductors 60, 62 and causes the armature 24 to be maintained in a closed position against the bias of the spring 28. The opening of any of the switches in the circuit will immediately deenergize the solenoid 42 and open the circuit to the coil of relay 18, thereby permitting armature 24 to be returned to the left or open position. Thus, it will be seen that application of the brakes will open brake switch 32 and deenergize the circuit. The operator must again actuate one of the buttons to thereafter energize the solenoid 42.

If it is desired to eliminate the aformentioned effect of the brake control the operator will press button 78. This will open switch 64 and close switch 68 to energize the relay 66. A speed setting control, which may be of the type disclosed in the copending application of Petersen, Serial No. 833,251, filed August 12, 1959, and now Patent No. 3,068,953, issued December 18, 1962, and assigned to the assignee of the present invention, will maintain the switch 82 in the closed position when the vehicle is traveling at the selected speed. Current will then flow from battery 10 via conductors 12 and 70, the switches 68 and 82, the conductor 72 to the conductor 30, and through the brake switch 32 in the aforementioned manner to actuate the solenoid 42. Application of the brakes will momentarily deenergize the speed maintaining solenoid 42. Although the circuit of this solenoid is opened upon application of the brake pedal 34, it will be immediately and automatically reenergized when the brakes are released and the set desired vehicle speed is regained to close switch 82 to return switch 32 to the closed position since the relay 66 is grounded, as at 76, and remains energized to keep armature or switch 68 closed. The buttons or levers 20, 78, are manually controllable to both the engage and release positions so that a new speed setting may be made at will at all times.

What is claimed is:

1. Speed control apparatus comprising an electrical source and a speed maintaining device operatively associated with a vehicle throttle, a first electrical circuit operatively connected to said speed maintaining device, a second electrical circuit operatively connected to said speed maintaining device, manually operable circuit energizing means in each of said circuits movable between circuit energizing and deenergizing positions, a vehicle operating condition actuated switch in said circuits operable to an open circuit deenergizing position during occurrence of the vehicle operating condition, first holding means operably associated with said manual energizing means in said first circuit to maintain said manual means in said circuit energizing position, means actuated by said vehicle operating condition switch to render said first holding means inoperative and thereby permit said manual means in said first circuit to move to said deenergizing position, and a second holding means operably associated with asid manual energizing means in said second circuit to maintain said manual energizing means in said energizing position during occurrence of the vehicle operating condition.

2. In a vehicle, an electrical source, operator controlled throttle control linkage, a brake and a speed maintaining apparatus comprising an electrically operated throttle control linkage position maintaining means, first and second circuits electrically connecting said source and said throttle control linkage position maintaining means, a brake actuated switch controllably associated with each of said circuits and adapted to be opened during brake application, an ignition switch controllably associated with said circuits, a transmission switch controllably associated with said circuits and adapted to be closed in forward drives only, a manually operated switch associated with each of said circuits, means for maintaining the closed position of said manually operated switch in each of said circuits while said circuits are energized, and means for opening one of said manually operated switches and deenergizing only one of said circuits when said brakes are applied.

3. A vehicle throttle control linkage position maintaining device comprising, manually actuable members mounted on the vehicle instrument panel, a circuit controlling switch operatively connected to each of said members, spring means biasing each switch to an open position, first and second electrical circuits energized by movement of each member against the spring bias to switch closed positions, energized holding means in said circuits to maintain said circiut controlling switch closed positions and energize said circuits, a brake switch in said circuits adapted to be opened upon brake application, throttle control linkage position maintaining means operable upon energization of either of said circuits, means in one of said circuits to deenergize said holding means and said circuit upon brake application and means in the other of said circuits to momentarily deenergize said other circuit and said throttle control linkage position maintaining means upon brake application.

4. The device as specified in claim 3 wherein a transmission control member and an ignition control member are operably associated with said throttle control linkage position maintaining means and limit actuation thereof to vehicle operating conditions of closed ignition and forward drives.

*5. Speed control apparatus comprising an electrical energy source; a speed maintaining device operative to maintain some predetermined speed; and an electrical circuit extending between the source and the device for controlling the operation of the device, the electrical circuit including relay means operative to close the circuit when operated, an operating condition responsive switch between the relay means and the device and so arranged when actuated as to open the electrical circuit and cause the device to be deactivated, and manually controlled switch means selectively operable to connect the source to the relay means, the relay means when operated to close the circuit being so arranged as to provide a shunt path therethrough for the power from the source and thereby be caused to remain operative when the operating condition responsive switch is actuated to open the circuit thereby permitting the device to be reactivated when the operating condition responsive switch is actuated to close the circuit.*

*6. Speed control apparatus comprising an electrical*

*source; a speed maintaining device operative to maintain some predetermined speed; and an electrical circuit controlling operation of the speed maintaining device; the electrical circuit including manually controllable switch means communicating with the source, plural branches extending from the switch means to the device and selectively connectable by the switch means with the source, an operating condition responsive switch so arranged when actuated as to open the electrical circuit and cause the speed maintaining device to be deactivated, and control means operated by the switch means so as to initiate current flow in one of the plural branches, the control means being so arranged as to be responsive to the current flow in the one branch and thereby be caused to remain operative to continue current flow in the one branch when the operating condition actuated switch is actuated to open the circuit thereby permitting the device to be reactivated when the operating condition actuated switch is actuated to close the circuit.*

*7. In a throttle controlled vehicle, the combination of an electrical energy source, a speed maintaining device operative to maintain a certain setting of the throttle, an electrical circuit extending between the source and the device for controlling the actuation thereof, the electrical circuit including relay means operative to close the circuit when operated, manually controlled switch means selectively operable to connect the source to the relay means and also to open and close the circuit, and a vehicle operating condition actuated switch between the relay means and the device and arranged when actuated to open the circuit, the relay means when operated to close the circuit being so arranged as to provide a shunt path therethrough for the power from the source and thereby caused to remain operative when the vehicle operating condition actuated switch is actuated to open the circuit.*

*8. In a throttle controlled vehicle having a brake; the combination of an electrical source; a speed maintaining device operative to maintain a certain setting of throttle; and an electrical circuit controlling operation of the speed maintaining device; the electrical circuit including manually controllable switch means selectively operable to connect the device to the source, a brake operated switch so arranged when actuated as to open the electrical circuit and cause the speed maintaining device to be deactivated, and relay means controlled by the switch means so as to close the circuit, the relay means when operative to close the circuit being so arranged as to provide a shunt path therethrough for the current flow and thereby be caused to remain operative to continue current flow therethrough when the brake operated switch is actuated.*

*9. In a throttle controlled vehicle having a brake; the combination of an electrical source; a speed maintaining device operative to maintain a certain setting of the throttle; and an electrical circuit controlling operation of the speed maintaining device; the electrical circuit including manually controllable switch means communicating with the source, plural branches extending from the switch means to the device and selectively connectable by the switch means with the source, a brake operated switch so arranged when actuated to open the electrical circuit and cause the speed maintaining device to be deactivated, and relay means operated by the switch means so as to initiate current flow in one of the plural branches, the relay means having relay contacts for completing the one branch when closed by operation of the switch means and a relay winding so arranged relative to the one branch as to provide a parallel path therethrough for the current flow in the one branch and thus in response to the current flow therethrough maintain the relay contacts closed thereby continuing current flow in the one branch when the brake operated switch is actuated.*

*10. In a throttle controlled vehicle having a brake; the combination of an electrical source; a speed maintaining device operative to maintain a certain setting of the throttle; and an electrical circuit controlling operation of the speed maintaining device, the electrical circuit including manually controllable switch means for selectively connecting the device to the source, a brake operated switch so arranged when actuated to open the electrical circuit and cause the speed maintaining device to be deactivated, a shunt path for current between the switch means and the brake operated switch, and relay means operated by the switch means so as to cause current flow to be by way of the shunt path, the relay means having relay contacts for completing the shunt path when closed and a relay winding arranged in parallel with the shunt path so as to provide a current path therethrough to the source and thus in response to the current flow therethrough maintain the relay contacts closed thereby continuing current flow in the shunt path when the brake operated switch is actuated.*

References Cited by the Examiner

The following references, cited by the Examiner, are of record in the patented file of this patent or the original patent.

UNITED STATES PATENTS

| | | | |
|---|---|---|---|
| 2,671,542 | 3/54 | Robnett | 192—3 |
| 2,714,880 | 8/55 | Riley | 123—103 |
| 3,023,828 | 3/62 | Fuller et al. | 180—82.1 |

A. HARRY LEVY, *Primary Examiner.*